United States Patent Office 3,282,645
Patented Nov. 1, 1966

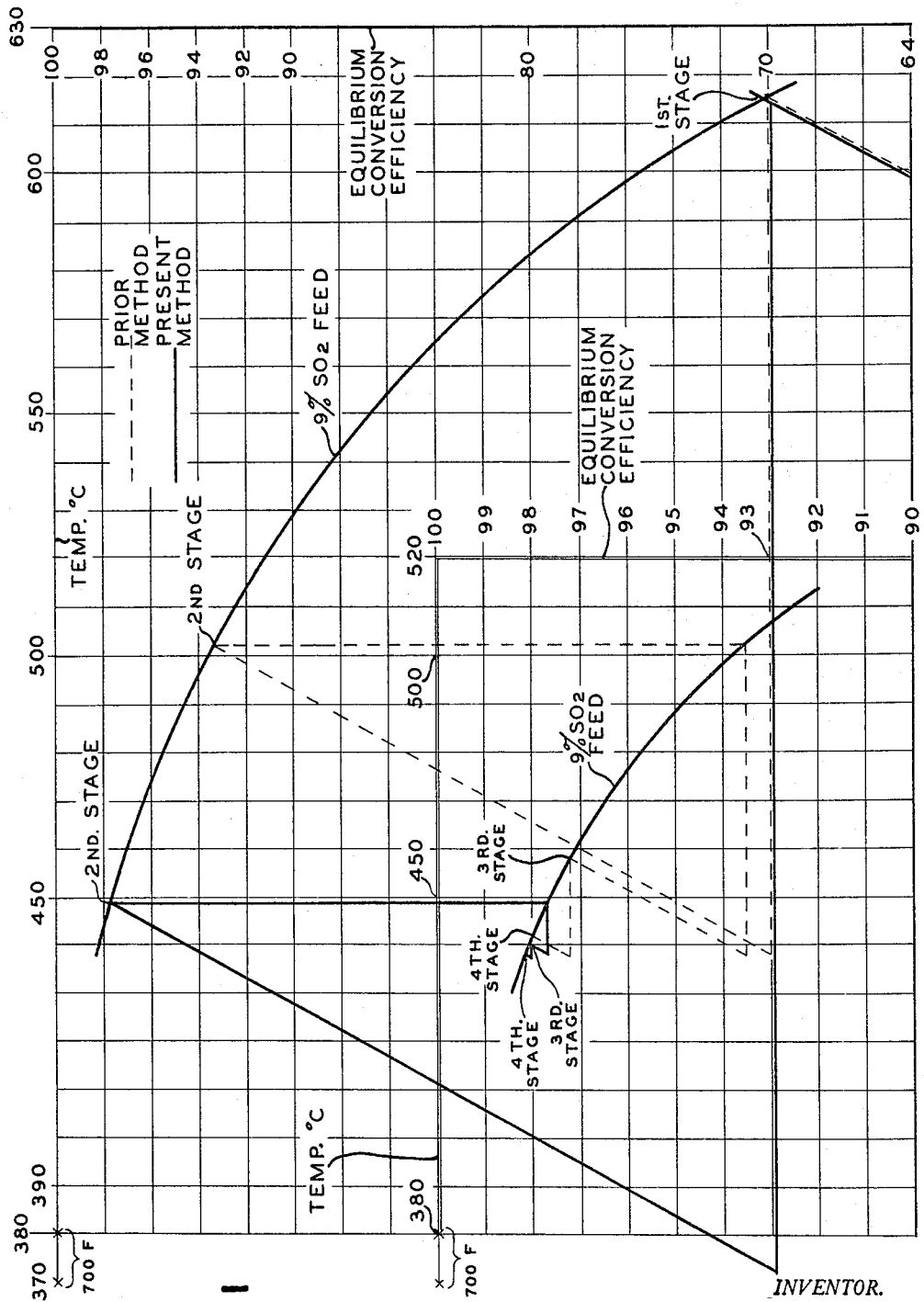
FIG. I
INVENTOR.
BERNARD G. MANDELIK

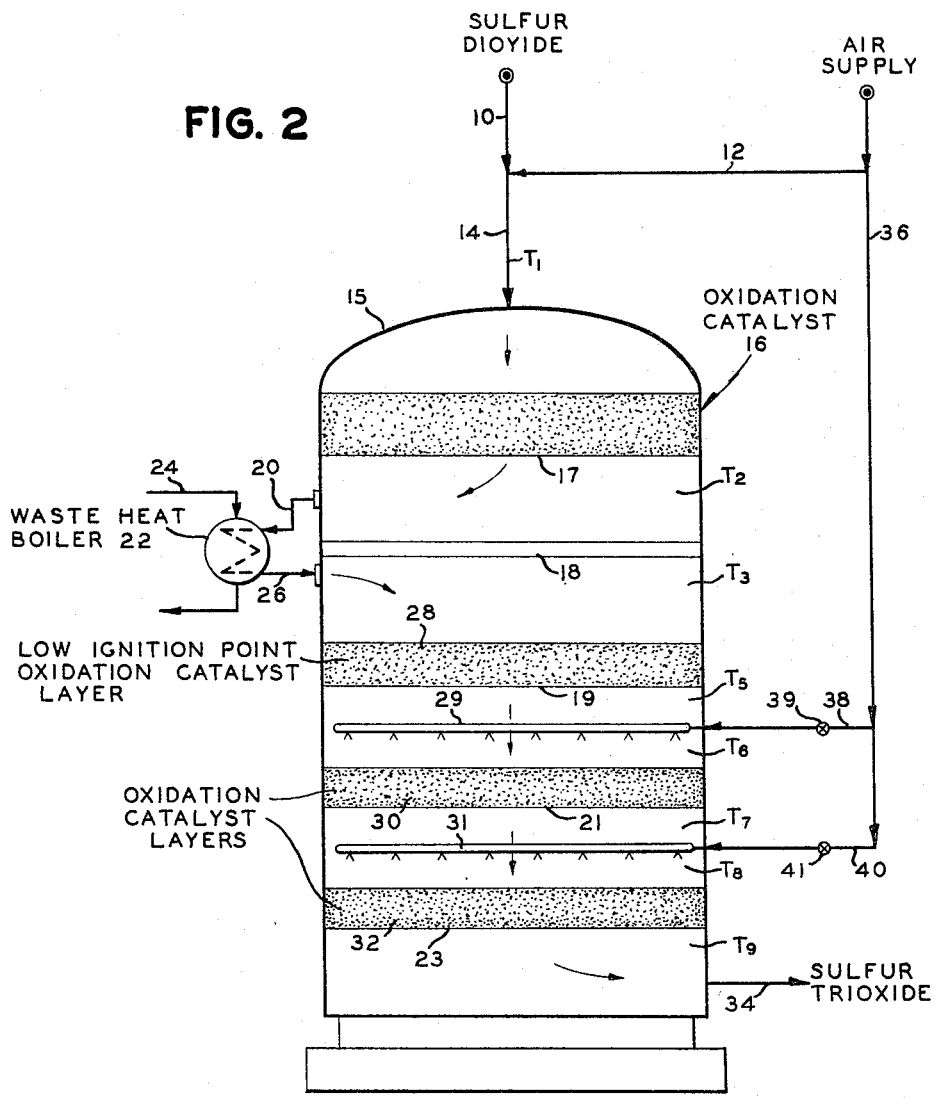

3,282,645
CONVERSION OF SULFUR DIOXIDE WITH LOW IGNITION CATALYSTS
Bernard G. Mandelik, Pleasantville, N.Y., assignor to Pullman Incorporated, a corporation of Delaware
Filed Aug. 5, 1963, Ser. No. 299,844
7 Claims. (Cl. 23—176)

The present invention relates to the conversion of sulfur dioxide to sulfur trioxide and, more particularly, to a novel method for the catalytic oxidation of sulfur dioxide to sulfur trioxide. Still more particularly, this invention relates to a method for improving the conversion efficiency and heat economy in the conversion of sulfur dioxide to sulfur trioxide.

The oxidation of sulfur dioxide to sulfur trioxide over a suitable catalyst in the production of sulfuric acid is a familiar operation to those skilled in the sulfuric acid art. Generally, the oxidation is carried out in a multi-stage converter containing several vertically superimposed trays of catalyst. A gaseous feed mixture of sulfur dioxide and oxygen is passed serially through the several stages. Since the reaction is exothermic, interstage cooling means are generally provided to remove the heat of reaction, which heat may be employed in superheating steam, for example, which is exported for use in other processes. The economics of this process is generally dependent upon the amount of steam which may be exported employing a given process design.

It is known that the conversion equilibrium for the production of sulfur trioxide is favored by lowering the temperature; and it is likewise known that the reaction rate is favored by increasing the temperature. Because of these two important competing factors and because of catalyst considerations, the commercial process designs have employed temperatures between about 755° F. and 935° F. in the catalytic oxidation zones. The kindling or ignition point of a standard platinum oxidation catalyst is approximately 752° F. The standard method of operation of a four-pass catalytic converter is known from the literature. The following table is presented to illustrate the standard method of operation.

TABLE I.—Standard reactor temperatures and conversions

| Stage | Temperature, ° F. | Percent Conversion |
|---|---|---|
| Gas entering first stage | 770–830 | 75–70 |
| Gas leaving first stage | 1,000–1,100 | |
| Gas entering second stage | 800–830 | 20–15 |
| Gas leaving second stage | 900–950 | |
| Gas entering third stage | 800–830 | 5–3 |
| Gas leaving third stage | 830–860 | |
| Gas entering fourth stage | 800–830 | 2–1 |
| Gas leaving fourth stage | 830–850 | |

Cooling is usually achieved after the first stage of conversion by means of indirect heat exchange in a waste heat boiler to produce saturated steam. Cooling between subsequent stages may be effected by internally located steam saturators or by introduction of cool dry air. Unfortunately, in the past it was necessary to employ three or four conversion stages in order to provide 98 percent conversion; and since an appreciable portion of the entire conversion was effected in each of the first three stages, it was necessary to employ three separate expensive pieces of heat exchange equipment to recover the heat of reaction from each of these stages.

It is an object of the present invention to provide a method for converting sulfur dioxide to sulfur trioxide whereby a 98 percent conversion may be obtained in two conversion stages.

Another object of the present invention is to provide an improved method for obtaining improved heat economy in the conversion of sulfur dioxide to sulfur trioxide.

Another object of the present invention is to provide a more economical method for the recovery of heat in the conversion of sulfur dioxide to sulfur trioxide.

Another object of the present invention is to overcome the inherent disadvantages of prior methods employed in the conversion of sulfur dioxide to sulfur trioxide.

The objects of the present invention are generally accomplished by cooling the gaseous effluent containing sulfur dioxide, oxygen and sulfur trioxide withdrawn from the first stage of catalytic oxidation to a temperature substantially below the temperature employed in the second stage of the prior methods and below the ignition point of standard platinum or vanadium oxidation catalysts, and then contacting the subcooled gas with a catalyst having a low ignition point to oxidize a further portion of the sulfur dioxide to sulfur trioxide. Operating in this manner, 98 percent conversion can be obtained in two catalyst stages and improved heat economy is achieved since a greatly increased amount of heat is extracted in a single location between the first and second catalyst stages. Such heat may be employed in the production of greater quantities of saturated steam for export from the process, thereby favorably affecting the economics of the method of the present invention.

In another aspect, the objects of the present invention are generally accomplished by providing a reaction zone containing at least two stages of oxidation catalyst. The first catalyst stage comprises a standard oxidation catalyst such as, for example, a platinum oxidation catalyst on a suitable carrier, e.g., asbestos, manganese sulfate, silica or silica and alumina, or platinum group metals, or vanadium pentoxide oxidation catalysts, all of which catalysts and their methods of preparation are well known in this art.

The second catalyst stage contains an oxidation catalyst of low ignition point suitable to kindle the oxidation reaction between sulfur dioxide and oxygen to produce sulfur trioxide at the temperature of the subcooled gaseous effluent of the first catalyst stage. In this respect, it is essential that a catalyst be employed in the second stage which has an ignition point such that it will kindle the aforementioned reaction at a temperature substantially less than about 750° F. and within the ranges of temperature later set forth herein.

A low ignition point catalyst can be produced by the impregnation of the standard catalysts hereinbefore mentioned with a suitable metal oxide such as, for example, $P_2O_5$ or $MoO_3$, or other metal oxides known in the art, which lower the ignition point of standard oxidation catalysts. Generally, the standard catalyst is impregnated with a small amount of the metal oxide, preferably between about 0.5 to about 3 percent by weight in order to achieve the desired lowering of the ignition point.

In a preferred method of operation, at least a third and most preferably a fourth catalyst layer is provided comprising one of the aforementioned standard catalysts. A gaseous mixture comprising sulfur dioxide and oxygen at an elevated temperature above about 750° F. is passed in contact with a standard oxidation catalyst in a first stage to convert a portion of the sulfur dioxide to sulfur trioxide, thereby heating the gaseous mixture to a superelevated temperature. The gaseous mixture is then cooled to a temperature below the aforementioned elevated temperature, and preferably to a temperature as low as practicable, and is passed at such temperature in contact with an oxidation catalyst of low ignition point in a second conversion stage. In a preferred method of operation, the gaseous effluent from the second stage is quench-cooled by contact with an oxygen-containing gas of low temperature and then passed to a third catalyst stage. Most preferably, the gaseous effluent from the third stage is again quench-cooled by contact with an oxygen-containing gas of low temperature and then passed to a fourth catalyst stage from which a gaseous mixture rich in sulfur trioxide is withdrawn for conversion to sulfuric acid. The gaseous sulfur trioxide present in the product effluent represents about 98 percent conversion efficiency from the sulfur dioxide in the feed.

In the first stage of conversion, a sulfur dioxide feed gas comprising between about 5 and about 14 percent of sulfur dioxide is generally employed. The temperature of the gaseous mixture fed to the first catalyst stage is maintained, generally, at an elevated temperature between about 750 and about 850° F. and preferably between about 770 and about 820° F. The oxidation catalyst employed in the first stage is a standard catalyst, as hereinbefore mentioned. Upon passage of the sulfur dioxide admixed with oxygen through the catalyst, a major portion of the conversion occurs and heat is given off raising the temperature of the resulting gaseous mixture to a superelevated temperature between about 1000 and about 1175° F.

In accordance with the present invention, interstage cooling is effected by passing the gaseous effluent of the first stage in indirect heat exchange with a suitable coolant material, preferably liquid water which is thereby converted to saturated steam, between the first and second catalyst to remove sufficient heat of reaction to cool such gaseous mixture to a subelevated temperature below about 750° F. Generally, the subelevated temperature to which the effluent of the first conversion zone is cooled is between about 675 to about 750° F. and preferably between about 700 and about 725° F. The gaseous mixture at such a subelevated temperature is then introduced to a second catalyst stage wherein it is contacted with an oxidation catalyst of low ignition point, as hereinbefore mentioned. It should be mentioned at this point, that it is not essential that the entire second stage or layer of catalyst consist of low ignition point catalyst. It is essential, however, that sufficient low ignition catalyst be present in such layer to kindle the oxidation reaction and to elevate the temperature of the subcooled gaseous material to a suitable level such that standard oxidation catalyst can be employed in the remaining portion of the layer to carry the reaction to the desired conversion efficiency. The gaseous mixture from the second stage is withdrawn at a temperature between about 820 and about 850° F., the temperature achieved being indicative of the extent of conversion with higher temperatures indicating higher conversions.

In the aforementioned preferred method of the present invention, one or more catalyst layers are employed in addition to the first and second layers in order to further increase the conversion efficiency. In accordance with the present invention, when additional catalyst layers are used, the temperature of the gaseous effluent from the previous stage is reduced to a suitable operating level by introducing a gaseous quenching stream of relatively low temperature. Preferably, the gaseous quenching stream comprises an oxygen-containing gas, e.g., air, at a relatively low temperature, preferably between about 60 and about 250° F., to cool the gases and to supply oxygen for the further conversion. Sufficient oxygen-containing gas is most preferably introduced at a temperature within the aforementioned temperature range between the second and third catalyst stages to cool the resulting gaseous mixture to a temperature between about 800 and about 830° F. The catalyst employed in the third catalyst stage is a standard catalyst such as, for example, the standard oxidation catalyst employed in the first catalyst stage. Upon passage of the gaseous mixture through the third catalyst stage, the heat of reaction raises the temperature of the effluent to a temperature between about 800 and about 830° F. Sufficient low temperature oxygen-containing gaseous material is introduced between the third and fourth catalyst layers to lower the temperature of the resulting gaseous mixture to between about 800 and about 820° F. This gaseous mixture is then passed through a fourth bed of catalyst comprising a standard catalyst, as hereinbefore mentioned. Further conversion results and the converted gaseous mixture which represents a conversion efficiency between about 98 and about 99 percent is withdrawn at a temperature between about 800 and about 820° F. to be employed in the production of sulfuric acid.

One important advantage of the present invention is that a higher conversion efficiency may be obtained by reason of the cooling of the reaction gases to as low a temperature as is practicable between the first and second catalyst stages and employing a catalyst of low ignition point in the second layer. The improved conversion is shown by reference to FIGURE 1 of the drawings, which is a plot of percent conversion efficiency against temperature in degrees Centigrade employing a feed to the first catalyst containing 9 percent sulfur dioxide. The yields obtained in the standard conversion method are shown by means of the broken line and the improved yields obtained by the operation in accordance with the present invention are shown by means of a solid line. It is apparent from this figure of the drawing that 70 percent conversion is obtained in the first stage of the prior methods as well as in the present methods. However, by reason of the increased interstage cooling in the present method made possible by employing a catalyst of low ignition point, about 98 percent conversion is obtained in the second stage instead of the fourth stage, as in the prior methods. It should be noted that the slope of the operating line was constructed without taking into account any temperature losses from the equipment, which losses may be neglected for the purposes of illustration.

Another important advantage of the present invention is that substantially all of the heat which is recoverable from the conversion may be recovered in a single piece of heat exchange equipment located in the path of flow of the gaseous effluent from first catalyst stage to the second stage, instead of in several costly pieces of heat exchange equipment as is the usual practice. This is, of course, made possible by the departure from the prior art methods which involves subcooling the gaseous effluent from the first catalyst stage below about 750° F. and to a temperature level as low as is practicable, taking into consideration the ignition point of the catalyst. All of the heat recovered by this method may be employed to obtain saturated steam. In the previous methods only the heat in the first stage could be economically employed to produce saturated steam, while the heat from the subsequent stages was employed for other purposes, e.g., superheating saturated steam.

Having described the invention in general terms, reference is now made to FIGURE 2 of the drawings which shows diagrammatically in elevation one embodiment of the method of the present invention.

The four-stage catalytic converter shown in FIGURE 2 comprises vertically positioned cylindrical shell 15 or other substantial enclosure means which contains therein a plurality of vertically disposed perforated catalyst trays denoted as 17, 19, 21 and 23, proceeding from the inlet to the outlet side of the converter. Horizontally disposed inner wall 18 is situated between trays 17 and 19 in order to prevent the direct flow of gas from the first to the second catalyst stage and to cause the effluent from the first conversion stage to be diverted, as shown by the arrows, to suitable interstage cooling means, such as waste heat boiler 22. Gas distribution means 29 is situated between trays 19 and 21 and a second gas distribution means 31 is situated between trays 21 and 23 in order to provide a means for quench-cooling gaseous material in those locations. Suitable gas inlet means 14 is provided adjacent catalyst tray 17 at the reactor inlet and suitable gas outlet means is provided to remove the product effluent from the outlet side of the reactor adjacent catalyst tray 23 at the bottom of the converter. Layers of standard oxidation catalysts 16, 30 and 32 are provided at trays 17, 21 and 23, respectively, while a catalyst layer 28 which comprises a catalyst of low ignition point is provided at tray 19, i.e., in the second stage of conversion. In one embodiment, the low ignition point layer of catalyst 28 is arranged such that only a small portion of the total amount of catalyst on tray 19 is a low ignition point catalyst. In such a case, the low ignition point catalyst is distributed as a layer over the top of standard catalyst in the lower portion of the tray, the reaction of the low temperature gas introduced from the interstage cooling means thereby heating such mixture to a temperature level such that the standard oxidation catalyst carries the conversion to the desired extent. It is generally desirable to minimize the amount of low oxidation point catalyst employed for economic reasons. The precise ratio of low ignition point to standard catalyst which is most economical must be determined for any given set of conditions.

In one example of the present process of the present invention described by reference to FIGURE 2, sulfur dioxide is introduced in line 10 at a temperature of 940° F. and a pressure of 16.45 p.s.i.a. In this example, the gas introduced in line 10 is derived from a sulfur burning unit which produces 14,320 s.c.f.m. of gas of the composition shown in Table II below. This gas is cooled to 940° F. by indirect heat exchange in a waste heat boiler.

TABLE II

| Component | Mol Percent |
|---|---|
| $SO_2$ | 12 |
| $O_2$ | 9 |
| $N_2$ | 78 |
| A | 1 |

The gas rate at this point is 14,320 standard cubic feet per minute (s.c.f.m.). To the gaseous mixture in line 10 is introduced air in line 12 at the rate of 2,990 s.c.f.m. at a temperature of 140° F. such that the resulting gaseous feed to the reactor in line 14 is introduced at T1, which is about 810° F.

The gaseous feed is passed through oxidation catalyst 16 which, in this example, comprises about 413 c.f. of standard vanadium pentoxide oxidation catalyst. The composition of the standard catalyst employed in this example is as follows: 7.5 percent $V_2O_5$, 10 percent $K_2O$ promoter, and the balance is silica-alumina support. The catalyst is packed to a depth of 15 inches. The gaseous effluent from catalyst layer 16 is at T2, which is about 1160° F. and a pressure of about 16.2 p.s.i.a. The composition of this gaseous mixture is as shown in Table III below:

TABLE III

| Component | Mol Percent |
|---|---|
| $SO_3$ | 7.21 |
| $SO_2$ | 3.08 |
| $O_2$ | 7.88 |
| $N_2$ | 80.79 |
| A | 1.04 |

This mixture is passed in line 20 to waste heat boiler 22 wherein it is exchanged against coolant stream 24 which comprises water from which saturated steam is produced In this example, the gaseous mixture introduced in line 26 is cooled to T3 which is about 700° F. at a pressure of about 15.95 p.s.i.a. The cooled gaseous mixture is then passed through catalyst layer 28 which consists of about 413 c.f. of catalyst packed to a total depth of about 15 inches, the top 3 inches being a catalyst of low ignition point. In this example the low ignition point catalyst has essentially the same composition as the standard catalyst except that in addition to the aforementioned percentages of $V_2O_5$ and $K_2O$ it contains 1 percent by weight $P_2O_5$ and the balance is silica-alumina support. Further conversion takes place in layer 28 and the effluent mixture is removed at T5, which is about 835° F. at 15.75 p.s.i.a. Air at 140° F. is supplied at this point from lines 36 and 38 containing control valve 39 situated thereon and by means of gas distributor 29. In this example, 1500 s.c.f.m. of air is provided in line 36 and sufficient air is introduced through control valve 39 to reduce the temperature of the mixture to T6 which is about 820° F. The gaseous mixture at this temperature is then passed through oxidation catalyst layer 30, which, in this example, has the same composition as the standard oxidation catalyst in layer 16. Further conversion takes place in this catalyst layer and the gaseous effluent is withdrawn at T7 which is about 835° F. Sufficient air is introduced in line 40 having control valve 41 situated thereon and by means of gas distributor 31 such that the temperature of the gaseous mixture at T8 is reduced to about 820° F. This gas is then passed through catalyst layer 32 which has the same composition as catalyst layer 30. The gaseous effluent which is withdrawn from catalyst layer 32 at T9 is not substantially elevated above 820° F. and contains about 9.35 percent sulfur trioxide which is withdrawn from the converter by means of line 34.

Having thus described the invention by reference to a specific example and to a specific embodiment of method and means thereof, it is apparent that many modifications and alterations will become apparent to those skilled in the art, but the present invention should be limited only by the claims.

What is claimed is:

1. A method of converting sulfur dioxide to sulfur trioxide which comprises passing a gaseous mixture comprising sulfur dioxide and oxygen at an elevated temperature between about 750 and about 850° F. on contact with a first bed of oxidation catalyst to convert a portion of said sulfur dioxide to sulfur trioxide thereby heating such mixture to a superelevated temperature between about 1000 and about 1175° F., passing such mixture in indirect heat exchange with a coolant material to cool said mixture to a subelevated temperature between about 675 and about 750° F., passing such mixture at such subelevated temperature in contact with an oxidation catalyst having an ignition point substantially below the ignition point of the catalyst in said first bed and below about 750° F. to convert a further portion of sulfur dioxide to sulfur trioxide.

2. The method of claim 1 in which said elevated temperature is between about 770 and about 820° F.

3. The method of claim 1 in which said subelevated temperature is between about 700 and about 725° F.

4. A method of converting sulfur dioxide to sulfur trioxide which comprises passing a gaseous mixture containing sulfur dioxide and oxygen at an elevated temperature between about 750 and about 850° F. in contact with a first bed of oxidation catalyst to convert a portion of said sulfur dioxide to sulfur trioxide thereby heating the resulting gaseous mixture to a superelevated temperature between about 1000 and about 1175° F., passing said gaseous mixture in indirect heat exchange with water to cool said mixture to a temperature between about 675 and about 750° F. while generating steam from said water, passing said thus-cooled mixture in contact with a second bed of oxidation catalyst having an ignition point substantially below the ignition point of the catalyst in the first bed and below about 750° F. to convert a further portion of said sulfur dioxide to sulfur trioxide.

5. A method of converting sulfur dioxide to sulfur trioxide which comprises passing a gaseous mixture containing sulfur dioxide and oxygen at an elevated temperature between about 750 and about 850° F. in contact with a first bed of oxidation catalyst to convert a portion of said sulfur dioxide to sulfur trioxide thereby heating the resulting gaseous mixture to a superelevated temperature between about 1000 and about 1175° F., passing said gaseous mixture in indirect heat exchange with water to cool said mixture to a temperature between about 675 and about 750° F. while generating steam from said water, passing said thus-cooled mixture in contact with a second bed of oxidation catalyst having an ignition point substantially below the ignition point of the catalyst in the first bed and below about 750° F. to convert a further portion of said sulfur dioxide to sulfur trioxide thereby heating the resulting gaseous mixture to an elevated temperature, introducing an oxygen-containing gas at a low temperature relative to said subelevated temperature to cool said resulting gaseous mixture withdrawn from said second bed to a temperature suitable for further conversion and to supply oxygen thereto, and then passing the thus-cooled gaseous mixture in contact with a third bed of oxidation catalyst.

6. The method of claim 5 in which said catalyst in said third bed as well as the catalyst in said first bed has an ignition point substantially above the relatively low ignition point catalyst of said second bed.

7. A method of converting sulfur dioxide to sulfur trioxide which comprises passing a mixture containing sulfur dioxide and oxygen at an elevated temperature between about 750 and about 850° F. in contact with a first bed of oxidation catalyst to convert a portion of said sulfur dioxide to sulfur trioxide thereby heating such mixture to a superelevated temperature between about 1000 and about 1175° F., passing said mixture in indirect heat exchange with a coolant material to cool said mixture to a subelevated temperature between about 675 and about 750° F., passing the mixture at such subelevated temperature in contact with a second bed of oxidation catalyst comprising a first layer of oxidation catalyst having an ignition point substantially below the ignition point of the catalyst in said first bed and below about 750° F. superimposed upon a second layer of oxidation catalyst having a relatively higher ignition point than said first layer to convert a further portion of said sulfur dioxide to sulfur trioxide.

References Cited by the Examiner

UNITED STATES PATENTS

| 1,789,460 | 1/1931 | Clark | 23—176 |
| 2,799,560 | 7/1957 | Davies | 23—176 |
| 3,142,536 | 7/1964 | Guth et al. | 23—175 |

OTHER REFERENCES

Fairlie: "Sulfuric Acid Manufacture," Reinhold Publishing Corporation, New York, pp. 43, 44, 387, 388.

Miles: "Manufacture of Sulfuric Acid" (Contact Process) (1925), pp. 168–170.

OSCAR R. VERTIZ, *Primary Examiner.*

MAURICE A. BRINDISI, BENJAMIN HENKIN,
*Examiners.*

R. M. DAVIDSON, M. WEISSMAN,
*Assistant Examiners.*